United States Patent [19]

Mitamura et al.

[11] 4,287,531
[45] Sep. 1, 1981

[54] DEFLECTION CONTROL APPARATUS FOR A BEAM INDEX COLOR CATHODE RAY TUBE

[75] Inventors: Ichiro Mitamura; Akira Tooyama, both of Tokyo; Takashi Hosono, Kanagawa, all of Japan

[73] Assignee: Sony Corporation, Tokyo, Japan

[21] Appl. No.: 95,557

[22] Filed: Nov. 19, 1979

[30] Foreign Application Priority Data

Nov. 21, 1978 [JP] Japan .................................. 53-143760

[51] Int. Cl.$^3$ .............................................. H04N 9/24
[52] U.S. Cl. ....................................................... 358/67
[58] Field of Search ........................ 358/67, 68, 69, 70, 358/66

[56] References Cited

U.S. PATENT DOCUMENTS 3,536,823  10/1970  Goode et al. ........................... 358/67

FOREIGN PATENT DOCUMENTS

779579  7/1957  United Kingdom .
818669  8/1959  United Kingdom .

Primary Examiner—Richard Murray
Attorney, Agent, or Firm—Lewis H. Eslinger; Alvin Sinderbrand

[57] ABSTRACT

Deflection control apparatus is disclosed for a beam index color television receiver of the type which includes a cathode ray tube adapted to display a video picture in response to a received color television signal. The beam index cathode ray tube is provided with index stripes which are scanned by the electron beam as the beam scans a raster across the display screen of the tube. A detector detects when the respective index stripes are scanned by the beam so as to produce an index signal, the frequency of which varies from a predetermined frequency value when the scanning speed of the beam varies. An oscillator generates an oscillating signal that is synchronized with the index signal, and a phase locked loop, which includes a comparator for comparing the index signal to the oscillating signal so as to produce a control signal as a function of the difference therebetween, adjusts the frequency of the oscillating signal in accordance with that control signal. The television receiver also includes a switching arrangement which is responsive to the oscillating signal to switch color information signals for the purpose of modulating the beam. The deflection control apparatus includes a deflection device for controlling the deflection of the beam; and a deflection signal generator responsive to the control signal produced by the phase-locked loop for supplying deflection control signals to the deflection device so as to vary the deflecting speed of the beam and thereby maintain a substantially constant scanning speed thereof.

15 Claims, 7 Drawing Figures

DEFLECTION CONTROL APPARATUS FOR A BEAM INDEX COLOR CATHODE RAY TUBE

BACKGROUND OF THE INVENTION

This invention relates to electron beam deflection control apparatus for use in a beam index color television cathode ray tube and, more particularly, to such apparatus which achieves desirable uniformity in the scanning speed of the electron beam so as to avoid non-linearities therein.

Beam index color television receivers have long been known, such as described in U.S. Pat. No. 2,791,626 to Hergenrother; U.S. Pat. No. 2,945,087 to Graham et al.; U.S. Pat. No. 3,042,392 to Keiper et al.; U.S. Pat. No. 3,249,688 to Davidse et al.; and U.S. Pat. No.4,003,082 to Fumoto. In a typical beam index color television receiver, the cathode ray tube (CRT) has a single electron beam which scans the color phosphor elements provided on the display screen of the CRT, the scanning electron beam being modulated with the appropriate color information as the beam scans the respective color elements. This differs from the conventional color CRT in which three individual electron beams simultaneously scan the color phosphor stripes with each beam being modulated with its associated color information.

A typical display screen of a beam index CRT is described in copending application Ser. No. 969,975, filed Dec. 15, 1978. The color phosphor stripes, which are formed as triads of red (R), green (G) and blue (B) stripes, are arranged sequentially and in the horizontal scanning direction so that the beam repeatedly scans RGB RGB . . . phosphor stripes. When the beam scans the R stripe, red color information is used to modulate the intensity of the beam, and when the beam scans the G stripe, green color information is used to modulate the intensity of the beam, and when the beam scans the B stripe, blue color information is used to modulate the intensity of that beam. An index signal is generated in synchronism with the scanning of the electron beam so as to control the "switching" of the color information at the appropriate times so as to modulate the beam with the red, green and blue information as the beam scans the R, G and B phosphor stripes, respectively.

As described in the aforementioned copending application, the index signal is derived from a series of fluorescent or phosphorescent index stripes which are arranged behind the color phosphor stripes and in predetermined positional relationship therewith. As the beam scans its raster, the beam first impinges upon the index stripes and then upon the color phosphor stripes. This impinging electron beam excites each index stripe, in sequence, to emit light which is detected by a photodetector disposed so as to receive the light emitted by each excited index stripe. Consequently, the photodetector generates an index signal whose frequency is determined by the frequency of the light emitted by the scanned index stripes.

Of course, the frequency of the index signal derived from the photodetector is a function of the pitch of the index stripes and the horizontal scanning speed of the electron beam. As the speed of the beam increases, the index frequency, that is, the frequency of the index signal, likewise increases. If the pitch of the index stripes is increased (or decreased), depending upon the particular size of the CRT display screen, the technique used to place the index stripes on the screen, etc., the index frequency is reduced (or increased). Hence, if the electron beam scans in a non-linear manner, the non-uniformity in the scanning speed thereof introduces corresponding non-uniformities in the index frequency.

As is known, there is a time delay in the television signal processing circuit of the beam index color television receiver from the time that the photodetector detects the index signal to the time that the "color switching" is carried out. That is, the position of the electron beam will be advanced at the time that the intensity of that beam first is modulated with respective color information. This time delay generally is constant and, therefore, may be compensated so as to assure that red information is switched to modulate the intensity of the beam at the appropriate time that the beam reaches the R phosphor stripe, that the green information is switched to modulate the intensity of the beam at the appropriate time that the beam reaches the G phosphor stripe, and the blue information is switched to modulate the intensity of the beam at the appropriate time that the beam reaches the B phosphor stripe. However, if the horizontal deflection linearity of that beam varies from its normal level, that is, if the scanning speed of the beam is increased or decreased, the resulting change in the index frequency produces a phase shift in the times at which the red, green and blue information signals are switched to modulate the beam intensity. As a consequence of this disturbance in the timing of the color switching, color misregistration occurs. Thus, there is a definite need in detecting non-linearities in the scanning speed of the electron beam in a beam index color television receiver, and to compensate for such non-linearities in order to attain proper color registration of the displayed video picture.

Although the prior art is aware of various techniques and systems which have been used in so-called conventional color television receivers to improve the linearity of the horizontal deflection of the electron beams therein, such prior art techniques are not successful in overcoming the problem of color misregistration due to such non-linearities in a beam index color television receiver.

OBJECTS OF THE INVENTION

Therefore, it is an object of the present invention to provide improved deflection control apparatus for use in a beam index color television receiver.

Another object of this invention is provide apparatus for improving the linearity in the scanning speed, or horizontal deflection, of the electron beam in a beam index color cathode ray tube.

A further object of this invention is to provide improved deflection control apparatus for a beam index color cathode ray tube which is of relatively simple construction, yet attains a uniform scanning speed of the electron beam so as to avoid color misregistration.

Various other objects, advantages and features of the present invention will become readily apparent from the ensuing detailed description and the novel features will be particularly pointed out in the appended claims.

SUMMARY OF THE INVENTION

In accordance with this invention, deflection control apparatus is provided for a beam index color cathode ray tube of the type which displays a video picture in response to a received color television signal. The cathode ray tube is provided with index stripes disposed to be scanned by the electron beam of the cathode ray tube and a detector for detecting when respective index stripes are scanned by the beam so as to produce an index signal. The index frequency, that is, the frequency of the index signal, varies from a predetermined frequency value when the scanning speed of the beam varies. Thus, non-linearities in the horizontal deflection of the beam result in corresponding variations in the index frequency. In a beam index color television receiver which employs a beam index color CRT, an oscillator generates an oscillating signal whose frequency is synchronized with the index signal, and a phase-locked loop, including a comparator for comparing the index signal to the oscillating signal so as to produce a control signal as a function of the difference therebetween, adjusts the frequency of the oscillating signal in accordance with this control signal. A switching arrangement is responsive to the oscillating signal to switch color information signals for modulating the beam. The deflection control apparatus includes a deflection device for controlling the deflection of the beam; and a deflection signal generator which is responsive to the control signal produced by the phase-locked loop for supplying deflection control signals to the deflection device to vary the deflecting speed of the beam and thereby maintain a substantially constant scanning speed thereof. In one embodiment of this invention, the deflection device is comprised of an auxiliary correcting deflecting coil that is supplied with the deflection control signals. An integrator may be provided in the deflection signal generator to produce a deflection control signal which is an integrated version of the control signal produced by the phase-locked loop. In another embodiment of this invention, the deflection device includes the main horizontal deflection yoke, and the deflection signal generator controls the deflection currents flowing through that yoke so as to correspondingly vary the deflection speed of the beam.

BRIEF DESCRIPTION OF THE DRAWINGS

The following detailed description, given by way of example, will best be understood in conjunction with the accompanying drawings in which.

DETAILED DESCRIPTION OF PREFERRED EMBODIMENTS

Figure 1:
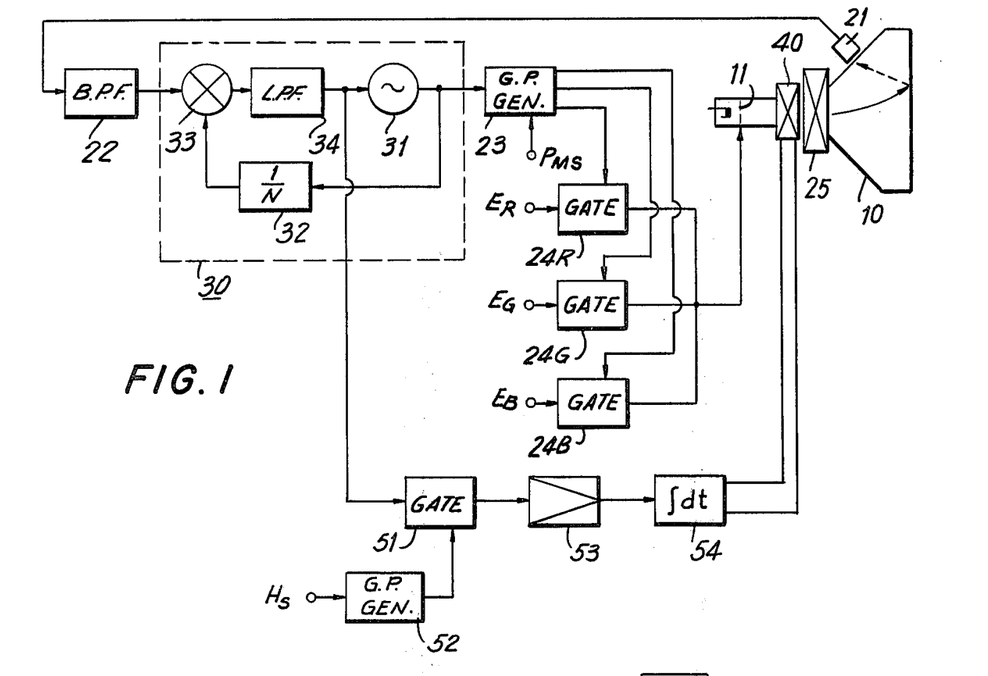
FIG. 1 is a block diagram of a portion of a beam index color television receiver which includes one embodiment of the present invention.

Referring now to the drawings, wherein like reference numerals are used throughout, and in particular to FIG. 1, there is illustrated therein a block diagram of a portion of a beam index color television receiver which incorporates one embodiment of the present invention. The television receiver includes a beam index cathode ray tube (CRT) 10 formed of a glass envelope and containing a cathode to emit a single electron beam, a grid 11 responsive to color information signals to modulate the intensity of the electron beam and a main horizontal deflection yoke 25 responsive to the usual horizontal deflection drive signal to deflect the electron beam horizontally. CRT 10 additionally is provided with the usual color phosphor stripes arranged in repetitive triads of red, green and blue (RGB) stripes mounted at or in the vicinity of the display screen. The aforementioned index stripes, formed of fluorescent or phosphorescent material, also is provided at or in the vicinity of the display screen, these index stripes exhibiting a predetermined positional relationship with the color phosphor triads. For example, each index stripe may be separated by two color phosphor stripes, or by four color phosphor stripes, etc. It is contemplated that the pitch of the index stripes may be related to the pitch of the color phosphor stripes such that one index stripe is provided after every five, seven, eight or ten color phosphor stripes. In other arrangements which may be used, one index stripe may be provided for one, two or three triads of color phosphor stripes. Reference is made to the aforementioned copending application Ser. No. 969,975 for a general discussion of the relationship between the pitch of the index stripes and the pitch of the color phosphor stripes.

CRT 10 also is provided with a photodetector 21 mounted on the glass envelope and positioned so as to receive light emitted from the respective index stripes when such stripes are excited by the scanning electron beam. In FIG. 1, the solid line shown within CRT 10 represents the scanning electron beam, and the broken line represents the light emitted by an excited index stripe, which light is received and detected by photodetector 21.

Photodetector 21 is responsive to the received light emitted from the excited index stripes to generate a corresponding signal. It is appreciated that the frequency of this signal, referred to as the index signal, is determined by the frequency at which the successive index stripes are excited. As mentioned above, this index frequency is directly related to the scanning speed of the electron beam and is inversely related to the pitch of the index stripes. The index signal, after suitable processing to be described below, is utilized in the beam index color CRT to control the switching of color information signals to modulate the intensity of the scanning electron beam. The index signal is supplied to a phase-locked loop 30 by a bandpass filter 22. The phase-locked loop functions to produce a repetitive signal, synchronized with the index signal derived from photodetector 21, to trigger a gate pulse generator 23. This gate pulse generator, which may comprise a ring counter as described in copending application Ser. No. 969,975, generates three mutually phased-shifted gate signals, each gate signal being associated with a respective color phosphor stripe. That is, the operation of the gate pulse generator is such that a red gate signal is generated whenever the electron beam advances into scanning relationship with the red phosphor stripe, a green gate signal is generated whenever the beam advances into scanning relationship with the green phosphor stripe, and a blue gate signal is generated whenever the beam advances into scanning relationship with the blue phosphor stripe. These gate signals are supplied to a red gate 24R, a green gate 24G and a blue gate 24B. These gates are supplied with the red information signal $E_R$, the green information signal $E_G$ and the glue information signal $E_B$, respectively. Such color information signals are received from, for example, a conventional television broadcast, and the usual television receiver processing circuits (not shown) recover these red, green and blue signals $E_R$, $E_G$ and $E_B$, respectively, from the received color television signals.

It is appreciated that the mutually phase-shifted gate signals generated by gate pulse generator 23 operate to turn ON only one of gate 24R, 24G and 24B at a given time. The outputs of these gates are coupled, in common, to grid 11, which may be the first grid of color CRT 10. Since only one of gates 24R, 24G and 24B is turned ON at a given time, the particular gate which is so energized gates the primary color signal ($E_R$, $E_G$ or $E_B$) supplied thereto to grid 11. As the electron beam scans a red phosphor stripe, or element, on the display screen of CRT 10, gate 24R is turned ON such that the red information signal $E_R$ is gated therethrough to grid 11 so as to modulate the scanning beam with the red information. Similarly, when the beam advances to a green phosphor element, gate 24G is turned ON to gate the green information signal $E_G$ therethrough to grid 11 so as to modulate the beam with this green information. Likewise, when the electron beam reaches a blue phosphor element, gate 24B is turned ON so as to gate the blue information $E_B$ therethrough to grid 11 so as to modulate the intensity of the beam with blue information. Although not shown herein, it may be appreciated that, if desired, an amplifier and additional shaping circuits may be provided between the outputs of gate 24R, 24G and 24B and grid 11.

Let it be assumed that the index frequency of the index signal produced by photodetector 21 is represented as $f_i$. If a predetermined ratio exists between the pitch of the index stripes and the pitch of the color phosphor stripes, then the index frequency $f_i$ will exhibit a predetermined proportion relative to the scanning of the color phosphor stripes. For example, if an index stripe is provided after every two color stripes, that is, if the pitch of the index stripes is $\frac{2}{3}$ of the pitch of a particular color stripe (i.e., three index stripes are scanned over an interval that only two particular color stripes, such as the red stripes, are scanned), then the index frequency $f_i$ will be 3/2 times the frequency at which this particular color stripe is scanned. If the index frequency $f_i$ is doubled, the resultant frequency ($2f_i$) is equal to three times the rate at which a particular color stripe is scanned. That is, this doubled index frequency $2f_i$ is three times the rate at which each red color stripe is scanned, and also is three times the rate at which each green color stripe is scanned, and also is three times the rate at which each blue color stripe is scanned. The purpose of phase-locked loop 30 is, in the illustrated embodiment, to produce this doubled index frequency ($2f_i$) signal to be supplied to gate pulse generator 23. The gate pulse generator distributes, at each output thereof, a respective red, green and blue gate signal, each gate signal having a frequency that is one-third the doubled index frequency ($2f_i$) and each gate signal being phase displaced from the others by 120°. As a result, the red gate signals are synchronized with the scanning of the red color stripes, the green gate signals are synchronized with the scanning of the green color stripes and the blue gate signals are synchronized with the scanning of the blue color stripes. The frequency of each of these red, green and blue gate signals is equal to the frequency at which the red, green and blue color stripes are respectively scanned. It may, therefore, be stated generally that gate pulse generator 23 functions to generate three respective gate signals, all of the same frequency (which frequency is referred to herein as the "triplet" frequency, meaning that it is the frequency at which the red or green or blue color stripes are scanned) and 120° phase-displaced from each other, all in response to an input signal supplied thereto by phase-locked loop 30, this input signal having a frequency that is three times the triplet frequency.

Phase-locked loop 30 is connected at its input to receive the index signal derived from photodetector 21 and filtered by bandpass filter 22. Preferably, an amplifier is provided either at the input or output of bandpass filter 22 to amplify the magnitude of the index signal. One example of such an amplifier is described in copending application Ser. No. 088,850 filed Oct. 29, 1979. The output of the phase-locked loop is connected to gate pulse generator 23 to supply the signal of doubled index frequency ($2f_i$) thereto. Phase-locked loop 30 is of conventional construction and includes a phase comparator 33 for comparing the phase of the index signal to that of a frequency-divided oscillating signal produced by a voltage controlled oscillator (VCO) 31 and frequency-divided by a factor 1/N by a divider 32. Any phase differential between these phase-compared signals produces an error signal which is supplied as a control signal via a lowpass filter 34 to VCO 31 so as to adjust the frequency of the oscillating signal generated thereby. Thus, the output of VCO 31 is phase-synchronized with the index signal.

In the example of CRT 10 described above, it is assumed that one index stripe is provided after every two color phosphor stripes, such that the ratio of the pitch of the index stripes to the pitch of the color phosphor stripes is $\frac{2}{3}$. With this pitch relationship, the factor N of divider 32 is equal to 2(N=2). However, if the ratio of the pitch of the index stripes to the pitch of the color phosphor stripes differs from this ratio of $\frac{2}{3}$, then the dividing ratio N of frequency divider 32 also differs from N=1. For example, if one index stripe is provided for every four color stripes, then the pitch ratio of index stripes to color phosphor stripes is 4/3, and N=4. As another alternative, if one index stripe is provided for every five color stripes, then N=5. Other examples of this pitch ratio will be appreciated, and additional description thereof is not provided.

If the deflection of the electron beam of CRT 10 is uniform, that is, if the horizontal scanning speed of the beam is linear, and if the pitch of the index stripes is constant, then the phase of the index signal will be equal to the phase of the frequency-divided oscillating signal such that phase comparator 33 detects no phase differential. However, if the horizontal scanning speed of the beam varies, then the phase of the index signal will vary in a corresponding manner, resulting in an error signal produced by phase comparator 33. Of course, phase-locked loop 30 functions to synchronize the phase of the oscillating signal generated by VCO 31 to the phase of the index signal, and this reduces the error signal to zero. Nevertheless, it is appreciated that the control signal produced by lowpass filter 34 (which is derived from the phase error signal) represents the variation in the scanning speed of the electron beam. The index frequency $f_i$, which is a representation of the beam scanning speed, is a function of the deflection current which flows in main deflection yoke 25. As is conventional, this deflection current is of a sawtooth waveform whose slope represents the beam scanning speed. Changes in the slope of this deflection current causes changes in the scanning speed of the beam. The scanning speed is not exactly proportional to the deflection current because deflection yoke 25 does not exhibit precise linearity.

However, the index frequency $f_i$ is a very close approximation to the rate of change (i.e. slope) of the deflection current. Therefore, the control signal produced by lowpass filter 34 is an approximate representation of the first derivative of the deflection current. If the deflection current is of constant slope, that is, if the scanning speed of the beam is linear, its first derivative is zero, and it is appreciated that, if the scanning speed of the beam is linear, the control signal produced by lowpass filter 34 likewise is a constant voltage.

The embodiment of the present invention, as shown in FIG. 1, proceeds upon the principal that the control signal produced by lowpass filter 34 represents the first derivative of the deflection current, and that the integral of this control signal can be used as a correcting deflection current to restore the scanning speed of the beam to a constant value. This correction in the scanning speed is attained by providing an auxiliary correcting deflection yoke 40 adjacent main deflection yoke 25, and supplying this correcting deflection yoke with a deflection control signal derived from the control signal produced by lowpass filter 34 of phase-locked loop 30. As illustrated, auxiliary correcting deflection yoke 40 is coupled to a deflection signal generator comprised of a gate circuit 51, an amplifier 53 and an integrator 54. The purpose of gate circuit 51 is to inhibit the control signal produced by lowpass filter 34 of the phase-locked loop from being supplied to amplifier 53 during the flyback interval of the color television signal, and also during the initial portion of the scanning interval of each scanning trace of the electron beam. The reason for this will be described in greater detail below. Of course, during most of the scanning trace of the beam, that is, during the scanning interval following the initial scanning portion thereof, gate circuit 51 passes the control signal to amplifier 53 which, in turn, amplifies this control signal and supplies it to integrator 54. The integrator is adapted to integrate this passed control signal; and the integrated control signal is supplied to auxiliary correcting deflection yoke 40 as a deflection control signal therefor.

Figure 2:
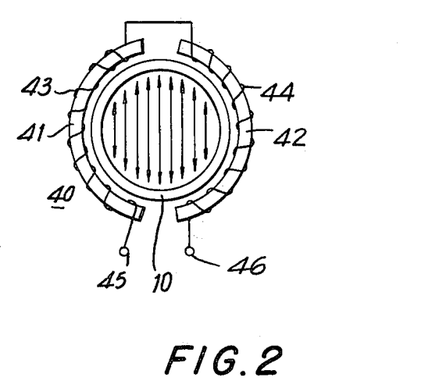
FIG. 2 is a diagrammatic representation of an auxiliary correcting deflection coil which is used in the embodiment of FIG. 1.

An example of the auxiliary correcting deflection yoke used in the embodiment of FIG. 1 is illustrated in FIG. 2 as comprising a correcting deflection coil wound upon a core. More particularly, the core is comprised of a pair of core members 41 and 42, and the correcting deflection coil is comprised of a pair of series-connected windings 43 and 44, these windings being wound upon core members 41 and 42, respectively. Windings 43 and 44 are provided with terminals 45 and 46 for receiving the deflection control signal from integrator 54.

Auxiliary correcting deflection yoke 40 preferably is positioned in the vicinity of the fourth grid (not shown) of color CRT 10. Core members 41 and 42 are in horizontally opposed relationship to each other such that when windings 43 and 44 are energized, that is, when deflection control currents flow therein, a magnetic field is produced, as represented by the vertical lines in FIG. 2. It is appreciated that this vertical magnetic field imparts a horizontal force on the scanning electron beam. The direction of this force is determined by the polarity of the magnetic field which, in turn, is determined by the polarity of the deflection control signal. Furthermore, the magnitude of this force is determined by the magnitude of the magnetic field which, in turn, is determined by the magnitude of the deflection control current.

The effect of auxiliary correcting deflection yoke 40 is to provide negative feedback control so as to stabilize the scanning speed of the electron beam. Let it be assumed that the electron beam is deflected by main deflection yoke 25 in a non-linear manner. Let it be further assumed that this non-linearity results in an undesired increase in the scanning speed of the electron beam. As the scanning speed of the beam increases, the index frequency $f_i$ also increases. Hence, the index signal will be out-of-phase with the oscillating signal generated by VCO 31 of phase-locked loop 30. As a result of this phase difference, phase comparator 33 produces an error signal, and this error signal appears as a control signal at the output of lowpass filter 34. This control signal is graphically represented in FIG. 3A. The higher frequency components shown at the beginning of each horizontal line interval (1H) are identified as noise components N. These noise components appear during the initial portion of each scanning trace because the deflection current supplied to main deflection yoke 25 contains a noise component. Those of ordinary skill in the television art recognize that this noise component is conventional in magnetic deflection circuits. As will be described, gate circuit 51 takes this noise component N into account and is not unduly influenced thereby.

Figure 3A:
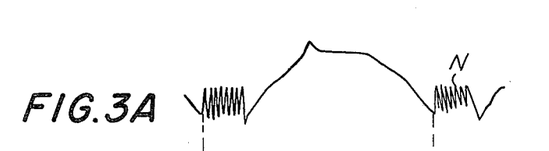
FIGS. 3A-3D are waveform diagrams which are useful in understanding the operation of the embodiment shown in FIG. 1.
Figure 3B:
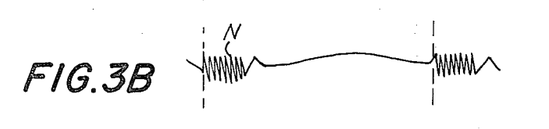
Figure 3C:
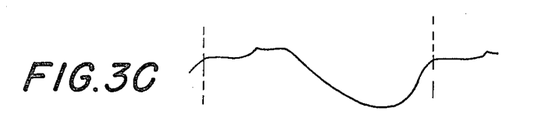
Figure 3D:
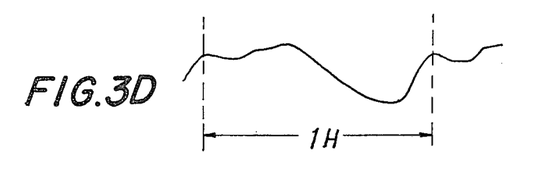

The control signal shown in FIG. 3A, and produced by lowpass filter 34, is passed by gate circuit 51 to amplifier 53; and this amplified control signal then is integrated by integrator 54. The integrated control signal, which is used as a deflection control signal, is illustrated in FIG. 3C. This deflection control signal is supplied to auxiliary correcting deflection yoke 40, and correcting deflection currents flow therein with the waveform illustrated in FIG. 3D. A comparison of FIGS. 3A and 3D illustrates that the correcting deflection current is opposite to the undesired increase in beam scanning speed. The correcting deflection current results in a correcting deflection field generated by the auxiliary correcting deflection yoke. This correcting deflection field is opposite the main deflection field so as to reduce the scanning speed of the electron beam, thereby restoring the linearity in its deflection. FIG. 3B is a waveform representation of the control signal produced by lowpass filter 34 of phase-locked loop 30 when correcting deflection yoke 40 produces a correcting deflection field for the scanning electron beam. It is seen from FIG. 3B that the error signal produced by phase comparator 33 is, essentially, zero. This means that the scanning speed of the electron beam has been controlled, under the influence of the auxiliary correcting deflection yoke, so as to maintain a substantially constant, linear speed. That is, variations in the scanning speed, as represented by FIG. 3A, are corrected, or compensated, by the deflection control apparatus illustrated in FIG. 1. Thus, changes in the scanning speed of the electron beam are detected by phase-locked loop 30, and these detected changes are used to generate a correcting deflection field so as to modify the deflection of the electron beam to return the scanning speed thereof to a substantially constant value.

In one example of the embodiment illustrated in FIGS. 1 and 2, the inductance of auxiliary correcting deflection yoke 40 is 3 milli Henrys, and the peak-to-peak value of the correcting deflection current flowing through this yoke is 13 milliamps. With these parameters, variations in the scanning speed of the electron beam are maintained within a range of ±0.7%.

As mentioned above, gate circuit 51 serves to selectively inhibit the control signal produced at the output of low pass filter 34 from being supplied to amplifier 53 during the flyback and initial scanning portions of each scanning trace of the electron beam. During the flyback interval, the electron beam does not scan the index stripes of color CRT 10. Hence, the output of photodetector 21 may contain a noise component, which component also may be present at the output of low pass filter 34. It is, of course, desirable that gate circuits 51 be closed during this flyback interval so as to prevent this undesired noise component from being passed to amplifier 53. If the gate circuit is opened during this flyback interval, the deflection control signal supplied to auxiliary correcting deflection yoke 40 will contain this noise component, resulting in an irregular deflection of the electron beam. This is avoided by gate circuit 51. Also and as shown in FIG. 3A, it is typical that the deflection currents flowing in a magnetic deflection yoke exhibit the noise component N during the initial portion of the scanning trace of the electron beam. Of course, such noise components do not deleteriously interfere with the video picture because such noise components are present only during the so-called lead-in, or marginal non-viewing portion of the display screen of CRT 10. Hence, the electron beam is seen to scan a non-viewing portion followed by the viewing portion of the CRT display screen during each scanning trace thereof. Since gate circuit 51 is closed during the scanning of this non-viewing portion, the deleterious influence of noise component N on the correcting deflection currents is avoided. Whereas the noise component N causes an irregular scan of the electron beam during this non-viewing portion, resulting in non-uniform changes in the index frequency $f_i$ of the index signal derived from photodetector 21, and also results in noise at the output of low pass filter 34, the fact that gate circuit 51 is closed during this non-viewing portion of the scanning trace blocks, or inhibits such noise components from being supplied to amplifier 53 or integrator 54.

Although the embodiment shown in FIG. 1 is provided with integrator 54, this integrator may be omitted. As is known, current flowing through an inductance is proportional to the integral of the voltage thereacross. Hence, in the absence of integrator 54, if amplifier 53 supplies an amplified voltage to auxiliary correcting deflection yoke 40, the inductance of this yoke results in a correcting deflection current therethrough which is proportional to the integral of the amplified voltage. Thus, whereas integrator 54 integrates the output of amplifier 53 to produce correcting deflection currents, the output of the amplifier may be applied directly to auxiliary correcting deflection yoke 40 to supply an amplified voltage thereto, and this voltage is integrated by the yoke to produce deflection currents therein.

Gate circuit 51 includes a gate pulse terminal supplied with a gate pulse produced by gate pulse generator 52. This gate pulse generator receives the horizontal synchronizing signal $H_s$ that is separated from a conventional television signal, to produce an inhibit (or enable) gate pulse during the flyback interval and non-viewing portion of each scanning trace. As may be appreciated, gate pulse generator 52 may include a monostable multivibrator which is responsive to the initiation of the horizontal synchronizing signal to generate an appropriate inhibit pulse.

Gate pulse generator 23, which may be comprised of a ring counter, as described above, is supplied with a so-called mode set pulse $P_{MS}$. This mode set pulse is adapted to preset gate pulse generator 23. The manner in which this mode set pulse is generated and used to control the gate pulse generator is described in greater detail in copending application Ser. No. 969,975. While the electron beam scans the non-viewing portion of the display screen, gates 24R, 24G and 24B are inhibited from supplying modulating signals to grid 11. Once the electron beam has reached the viewing portion of the display screen upon which the color phosphor stripes are provided, mode set pulse $P_{MS}$ terminates and gate pulse generator 23 triggers gates 24R, 24G and 24B in sequence, as discussed above.

Figure 4:
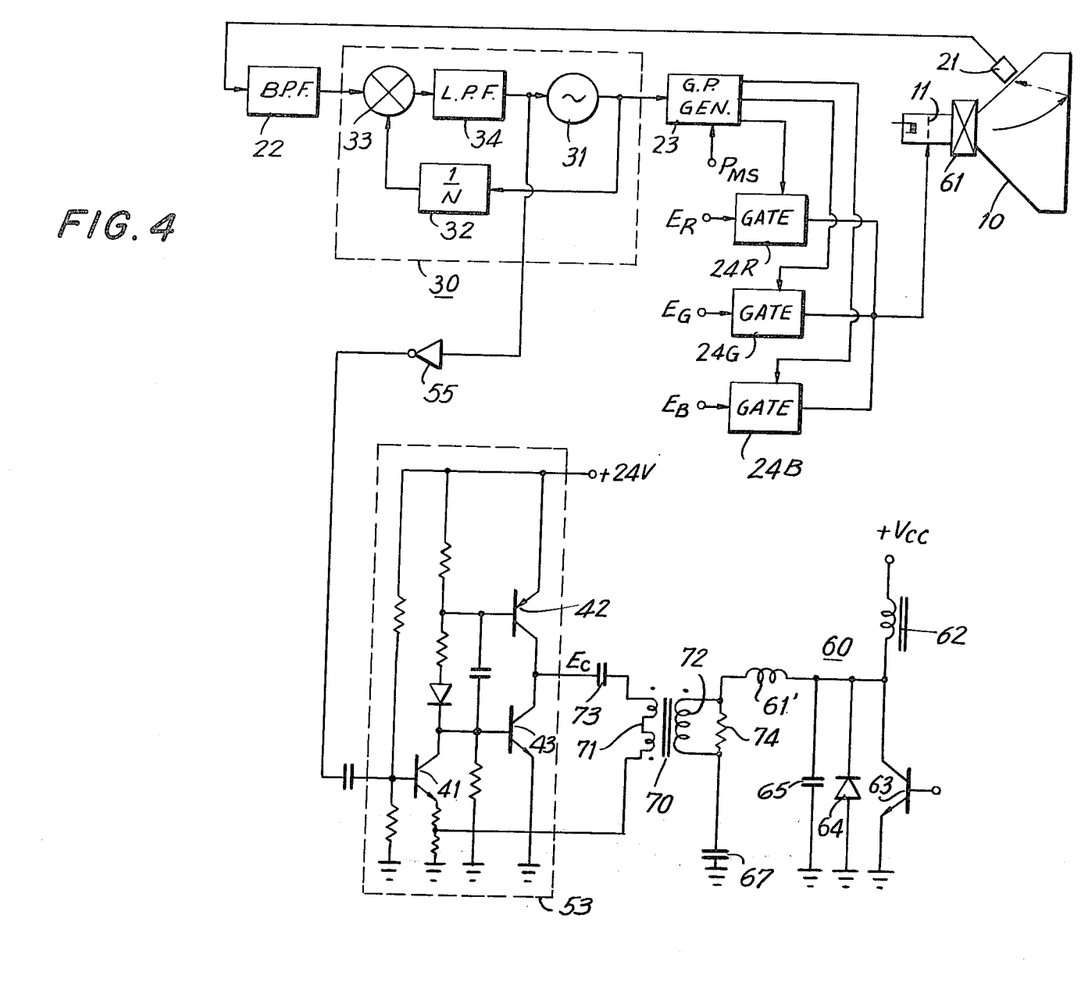
FIG. 4 is a partial block, partial schematic diagram of a beam index color television receiver which uses another embodiment of the present invention.

Turning now to FIG. 4, there is illustrated another embodiment of the present invention which can be used in a beam index color CRT. This embodiment differs from the aforedescribed embodiment of FIG. 1 in that auxiliary correcting deflection yoke 40 is omitted and the deflection control device is comprised of the main deflection yoke itself. In FIG. 4, the main deflection yoke is identified by reference numeral 61. The deflection signal generator which is used in the embodiment of FIG. 4 to supply deflection control signals to main deflection yoke 61 for the purpose of varying the deflecting speed of the electron beam is comprised of an amplifier 53 and a saturable reactor transformer 70. The saturable reactor transformer is conventional and includes a primary winding 71 coupled to amplifier 53 and a secondary winding 72. Secondary winding 72 is connected in parallel with a damper resistor 74, this parallel combination being connected in series with the horizontal deflection coil winding, referred to hereinafter merely as the horizontal deflection coil. In the interest of simplification, the horizontal deflection coil is identified by reference numeral 61'.

Saturable reactor transformer 70 exhibits the usual characteristic that the output impedance thereof, that is, the impedance of its secondary winding 72, is inversely related to the primary current, that is, to the current flowing through primary winding 71. Hence, as the primary current increases, the secondary impedance decreases; and as the primary current decreases, the secondary impedance increases. Since secondary winding 72 of saturable reactor transformer 70 is connected in series with horizontal deflection coil 61', it is appreciated that, as the secondary impedance of the saturable reactor transformer increases, the deflection current flowing through the horizontal deflection coil decreases so as to reduce the deflection speed of the electron beam. Conversely, as the secondary impedance of the saturable reactor transformer decreases, the deflection current flowing through horizontal deflection coil 61' increases so as to increase the deflection speed of the electron beam.

Horizontal deflection coil 61' and secondary winding 72 of saturable reactor transformer 70 are connected in a conventional horizontal deflection circuit 60. This horizontal deflection circuit includes a choke coil (or horizontal output transformer) 62, a switching transistor 63, whose collector-emitter circuit is connected in series with choke coil 62, a damper diode 64 connected in parallel with the collector-emitter circuit of transistor 63, a resonant capacitor 65 connected in parallel with damper diode 64 and an S-correction capacitor 67 connected in series with horizontal deflection coil 61' and secondary winding 72. Horizontal deflection circuit 60 operates in its conventional manner and, in the interest of brevity, further description thereof is not provided. It is, of course, appreciated that, in response to a switching signal supplied to the base electrode of switching transistor 63, a sawtooth-shaped deflection current flows through horizontal deflection coil 61'. As mentioned above, the magnitude of this deflection current is determined by the impedance of secondary winding 72. Of course, the magnitude of the horizontal deflection current determines the speed at which the electron beam is deflected.

Amplifier 53 is connected to the output of low pass filter 34 by an inverter circuit 55. This inverter circuit functions in conventional manner so as to invert an increasing control signal provided at the output of the low pass filter to a decreasing control signal and, conversely, to invert a decreasing control signal to an increasing signal. Amplifier 53 is comprised of a preamplifier transistor 41 whose base electrode is AC-coupled to the output of inverter circuit 55 and whose collector electrode is coupled to the base electrodes of complementary transistors 42 and 43. As illustrated herein, transistor 42 is a PNP transistor and transistor 43 is a NPN transistor, the collector electrodes of these transistors being connected in common and this common junction being coupled by capacitor 73 to primary winding 71 of saturable reactor transformer 70. Primary winding 71 also is fed back to the emitter circuit of transistor 41 such that, as the current through this primary winding increases, the emitter voltage of transistor 41 also increases so as to reduce the conductivity thereof. Hence, the connection of primary winding 71 to the emitter circuit of transistor 41 provides negative current feedback control over the current through the primary winding.

Phase-locked loop 30, gate pulse generator 23 and gate circuits 24R, 24G and 24B, all shown in the embodiment of FIG. 4, are substantially identical to the corresponding elements which have been shown and described previously with respect to the embodiment of FIG. 1. In the interest of brevity, further description of these components and their operation is not provided. Furthermore, although not shown in FIG. 4, it should be appreciated that, if desired, gate circuit 51 (of FIG. 1) may be provided in the circuit between low pass filter 34 and amplifier 53. If incorporated into the embodiment of FIG. 4, gate circuit 51 will, of course, perform the same selective inhibiting and gating function which has been described above.

Let it be assumed that the scanning speed of the electron beam in color CRT 10 increases. This results in an increase in the index frequency $f_i$ of the index signal derived from photodetector 21. Hence, phase comparator 33 produces a positive error signal, and low pass filter 34 supplies this error signal to inverter 55 as a control signal. This increased control signal is inverted by inverter 55 and supplied as a reduced signal to amplifier 53. This reduced signal, after being amplified by amplifier 53, is supplied as a voltage $E_c$ to primary winding 71 of saturable reactor transformer 70. That is, because of the increase in the control signal at the output of low pass filter 34, the current through primary winding 71 is reduced. It is recalled that this decrease in the primary winding results in an increase in the secondary impedance of the saturable reactor transformer. Consequently, the current flowing through horizontal deflection coil 61' is reduced so as to reduce the deflection speed of the electron beam. Therefore, the overall feedback loop which is used to control the scanning speed of the electron beam in color CRT 10 functions to maintain a substantially constant scanning speed thereof. Conversely, if the speed at which the electron beam is deflected is reduced, low pass filter 34 provides a reduced control signal to inverter 55, and the latter supplies amplifier 53 with an increased signal. The amplified voltage $E_c$ produced by amplifier 53 increases the current through primary winding 71 which, in turn, reduces the secondary impedance of the saturable reactor transformer. As a consequence of this reduced impedance, the deflection current through horizontal deflection coil 61' increases, thereby increasing the scanning speed of the electron beam. It is, therefore, seen that the illustrated apparatus functions to maintain a substantially constant scanning speed of the electron beam, regardless of whether the deflection speed increases or decreases.

While the present invention has been particularly shown and described with reference to certain preferred embodiments thereof, it should be readily apparent to those of ordinary skill in the art that various changes and modifications in form and details may be made without departing from the spirit and scope of the invention. For example, in the embodiment of FIG. 1, auxiliary correcting deflection yoke 40 may be a magnetic yoke, as shown in FIG. 2, or may be comprised of electrostatic deflection plates of a type known to those of ordinary skill in the art. The supplemental, correcting operation of these deflection plates is similar to that carried out by the aforedescribed auxiliary yoke. In the embodiment of FIG. 4, other variable impedance means or current control circuits may be coupled to horizontal deflection coil 61' so as to control the deflection current flowing therein as a function of the control signal produced by low pass filter 34. Amplifier 53 merely is illustrative of one type of amplifier that may be used in the embodiment of FIG. 4. Other embodiments may, of course, be used as desired. Furthermore, and as described above, integrator 54 in the FIG. 1 embodiment may be omitted, and amplifier 53 may be a current-drive amplifier having high output impedance, as is conventional for current drive amplifiers.

It is intended that the appended claims be interpreted as including the foregoing as well as various other changes and modifications.

What is claimed is:

1. Deflection control apparatus for a beam index color television receiver of the type including a cathode ray tube adapted to display a video picture in response to a received color television signal, said cathode ray tube having index stripes disposed to be scanned by the electron beam of said cathode ray tube; detecting means for detecting when respective index stripes are scanned by said beam to produce an index signal, the frequency of said index signal varying from a predetermined frequency value when the scanning speed of said beam varies; oscillating means for generating an oscillating signal whose frequency is synchronized with said index signal; phase-locked loop means including comparing means for comparing said index signal to said oscillating signal to produce a control signal as a function of the difference therebetween and to adjust the frequency of said oscillating signal in accordance with said control signal; and switching means for switching color information signals to modulate said beam in response to said oscillating signal; said deflection control apparatus comprising deflection means for controlling the deflection of said beam; and integrating means for integrating said control signal to produce an integrated deflection control signal, the integrated deflection control signal being supplied to said deflection means to vary the deflecting speed of said beam and thereby maintain a substantially constant scanning speed thereof.

2. The apparatus of claim 1 further comprising amplifying means for supplying an amplified version of said control signal to said integrating means.

3. The apparatus of claim 1 further comprising means for selectively inhibiting said integrated deflection control signal from being supplied to said deflection means during the flyback interval of said color television signal.

4. The apparatus of claim 3 wherein said cathode ray tube further has a display screen scanned by said beam, said display screen being provided with viewing and non-viewing portions; and said means for selectively inhibiting further inhibits said integrated deflection control signal from being supplied to said deflection means during those intervals in which said beam scans said non-viewing portions of said display screen.

5. The apparatus of claim 3 or 4 wherein said means for selectively inhibiting comprises gate means for selectively gating said control signal produced by said phase-locked loop means to said integrating means; and gate signal generating means responsive to the horizontal synchronizing signal included in said received color television signal to supply a gate signal of predetermined duration to said gate means.

6. The apparatus of claim 1, wherein said cathode ray tube is provided with a main deflection yoke and said deflection means comprises an auxiliary correcting deflection yoke.

7. The apparatus of claim 6 wherein said auxiliary correcting deflection yoke comprises a correcting deflection coil, and wherein said integrated deflection control signals are deflection control currents supplied to said correcting deflection coil.

8. The apparatus of claim 7 wherein said auxiliary correcting deflection yoke further comprises a pair of core members disposed on said cathode ray tube; said correcting deflection coil comprises a pair of series-connected windings respectively wound upon said pair of core members; and said deflection control currents have controllable magnitudes and/or polarities to vary the magnetic field generated by said windings so as to correspondingly vary the deflecting speed of said beam.

9. Deflection control apparatus for a beam index color television receiver of the type including a cathode ray tube adapted to display a video picture in response to a received color television signal, said cathode ray tube having index stripes disposed to be scanned by the electron beam of said cathode ray tube; detecting means for detecting when respective index stripes are scanned by said beam to produce an index signal, the frequency of said index signal varying from a predetermined frequency value when the scanning speed of said beam varies; oscillating means for generating an oscillating signal whose frequency is synchronized with said index signal; phase-locked loop means including comparing means for comparing said index signal to said oscillating signal to produce a control signal as a function of the difference therebetween and to adjust the frequency of said oscillating signal in accordance with said control signal; said control signal produced by said phase-locked loop means representing the variation of the scanning speed of said beam; and switching means for switching color information signals to modulate said beam in response to said oscillating signal; said deflection control apparatus comprising a main deflection yoke, transformer means having primary and secondary windings, one of which is coupled to said main deflection yoke, and amplifier means coupled to the other of said primary and secondary windings and responsive to said control signal to vary the current in said transformer means and thereby vary the current in said main deflection yoke so as to correspondingly vary the deflection speed of said beam.

10. The apparatus of claim 9 wherein said transformer means is a saturable reactor transformer.

11. Deflection control apparatus for a beam index cathode ray tube adapted to display a video picture, said cathode ray tube having index stripes disposed to be scanned by the electron beam of said cathode ray tube, a main deflection yoke for deflecting said beam along successive scanning traces, detecting means for detecting when respective index stripes are scanned by said beam to produce an index signal whose frequency varies from a predetermined frequency value when the scanning speed of said beam varies, oscillating means for generating an oscillating signal whose frequency is synchronized with said index signal, phase-locked loop means including a phase comparator for phase comparing the index and oscillating signals to produce a control signal as a function of the phase difference therebetween, said control signal representing the variation in the scanning speed of said beam and being operative to adjust the frequency of said oscillating signal, and switching means responsive to said oscillating signal for switching color information signals to modulate said beam, said deflection control apparatus comprising an auxiliary correcting deflection yoke responsive to deflection control signals supplied thereto to produce a correcting deflecting field so as to vary the deflection of said beam; gate means coupled to said phase locked loop means to pass the control signal produced by said phase comparator during a selected viewing interval in each scanning trace of said beam, and integrating means for integrating said passed control signal and supplying said integrated signal to said auxiliary correcting deflection yoke.

12. Deflection control apparatus for a beam index cathode ray tube adapted to display a video picture, said cathode ray tube having index stripes disposed to be scanned by the electron beam of said cathode ray tube, deflection yoke means including a deflection coil responsive to a deflection current flowing therein for deflecting said beam along successive scanning traces, detecting means for detecting when respective index stripes are scanned by said beam to produce an index signal whose frequency varies from a predetermined frequency value when the scanning speed of said beam varies, oscillating means for generating an oscillating signal whose frequency is synchronized with said index signal, phase-locked loop means including a phase comparator for phase comparing the index and oscillating signals to produce a control signal as a function of the phase difference therebetween, said control signal representing the variation in the scanning speed of said beam and being operative to adjust the frequency of said oscillating signal, and switching means responsive to said oscillating signal for switching color information signals to modulate said beam, said deflection control apparatus comprising deflection control signal generating means for generating a deflection control signal as a function of the control signal produced by said phase comparator and a variable impedance coupled to said deflection coil and responsive to said deflection control signal to exhibit a corresponding impedance, the amount of deflection current flowing through said deflection coil being a function of the variable impedance.

13. The apparatus of claim 12 wherein said variable impedance comprises the secondary winding of a saturable reactor transformer, said secondary winding being connected in series relation with said deflection coil.

14. The apparatus of claim 13 wherein said saturable reactor transformer includes a primary winding; and wherein said deflection control signal generating means comprises an amplifier having an input coupled to receive the control signal produced by said phase comparator and an output coupled to said primary winding of said saturable reactor transformer.

15. The control apparatus of claim 14 further comprising a negative feedback circuit from said saturable reactor transformer to said amplifier to maintain a relatively stable current in said primary winding of said saturable reactor transformer.

* * * * *